(12) United States Patent
Akiyama et al.

(10) Patent No.: US 8,856,618 B2
(45) Date of Patent: Oct. 7, 2014

(54) SCALABLE REPAIR BLOCK ERROR CORRECTION FOR SEQUENTIAL MULTIPLE DATA BLOCKS IN A MAGNETIC DATA STORAGE DEVICE

(71) Applicant: HGST Netherlands B.V., Amsterdam (NL)

(72) Inventors: Kei Akiyama, Yokohama (JP); Sridhar Chatradhi, San Jose, CA (US); Jonathan Darrel Coker, Rochester, NY (US); Martin Aureliano Hassner, Mountain View, CA (US); Kirk Hwang, Palo Alto, CA (US); Roger William Wood, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 55 days.

(21) Appl. No.: 13/645,309

(22) Filed: Oct. 4, 2012

(65) Prior Publication Data
US 2014/0101515 A1    Apr. 10, 2014

(51) Int. Cl.
*G11C 29/00* (2006.01)
(52) U.S. Cl.
USPC ............................ 714/763; 714/769; 714/752
(58) Field of Classification Search
CPC ............................ G06F 11/076; G06F 11/1008
USPC .................... 714/768, 769, 763, 752, 784, 37
See application file for complete search history.

(56) References Cited

U.S. PATENT DOCUMENTS

| | | | |
|---|---|---|---|
| 6,891,690 B2 | 5/2005 | Asano et al. | |
| 7,490,212 B2 | 2/2009 | Kasiraj et al. | |
| 7,529,966 B2 * | 5/2009 | Cochran et al. | 714/6.21 |
| 8,209,471 B2 * | 6/2012 | Yano et al. | 711/103 |
| 8,225,047 B2 * | 7/2012 | Yano et al. | 711/137 |
| 8,276,043 B2 * | 9/2012 | Yano et al. | 714/766 |
| 2005/0071537 A1 | 3/2005 | New et al. | |
| 2006/0039246 A1 * | 2/2006 | King et al. | 369/30.01 |
| 2006/0041789 A1 * | 2/2006 | Cochran et al. | 714/37 |
| 2010/0095181 A1 | 4/2010 | Ma et al. | |
| 2011/0075292 A1 | 3/2011 | New et al. | |
| 2011/0096828 A1 | 4/2011 | Chen et al. | |

* cited by examiner

*Primary Examiner* — Fritz Alphonse
(74) *Attorney, Agent, or Firm* — G. Marlin Knight

(57) ABSTRACT

A technique for recovering of "squeezed" sectors in a set of sequential sectors such as are used in Shingled Magnetic Recording (SMR) is described. Embodiments of the invention use a programmable erased sector recovery scheme, which is a concatenation of a "Cauchy-type" track erasure correction code, together with a media-error correction code that generates N-weighted parity-sectors per track and is capable of replacing up to N-erased sectors per track in any possible combination.

15 Claims, 5 Drawing Sheets

SCALABLE REPAIR BLOCK ERROR CORRECTION FOR SEQUENTIAL MULTIPLE DATA BLOCKS IN A MAGNETIC DATA STORAGE DEVICE

FIELD OF THE INVENTION

The invention relates to error correction techniques in magnetic data storage devices.

BACKGROUND

Conventional disk drives with magnetic media organize data in concentric tracks that are spaced apart. The concept of shingled writing is a form of magnetic recording and has been proposed as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on an SMR disk surface are organized into a plurality of shingled regions (also called I-region) which can be written sequentially from an inner diameter (ID) to an outer diameter (OD) or from OD to ID. Once written in the shingled structure, an individual track or sector cannot be updated in place, because that would overwrite and destroy the overlapping tracks. Shingle-written data tracks, therefore, from the user's viewpoint are sometimes thought of like append-only logs. To improve the performance of SMR drives, a portion of the media is allocated to so-called "exception regions" (E-regions) which are used as staging areas for data which will ultimately be written to an I-region. The E-region is sometimes referred to as an E-cache.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or at least something closer to a physical address.

The conventional LBA-PBA mapping for defects does not need to be changed often. In contrast, in an SMR device the physical block address (PBA) of a logical block address (LBA) can change frequently depending on write-history. For example, each change in the content of an LBA generally requires that the LBA be assigned to a new PBA and background processes such as garbage collection move data sectors from one PBA to another but the LBA stays the same. The indirection system provides a dynamic translation layer between host LBAs and the current physical locations on the media. In a SMR system, the LBA-PBA mapping generally changes with every write operation because the system dynamically determines the physical location on the media where the host data for an LBA will be written. When an LBA-PBA in a shingled track is updated, the old PBA is marked as a hole for garbage collection.

ECC in disk drives is used to correct errors and erasures, which occur when a data element is missing or known to be faulty. Traditional ECC is performed on a sector basis using redundant bits appended to the sector data. These sector ECC approaches are not ideal for some disk drive applications such as streaming audio-video (AV) and the SMR architecture presents additional ECC problems. Accordingly special error correction code (ECC) strategies for have been described for AV applications and SMR drives. When an LBA-PBA (sector) in a shingled track is updated, the old PBA is marked as an erased sector (hole) for garbage collection. The problem addressed by the invention described herein is the recovery of "squeezed" sectors in a Shingled Magnetic Recording (SMR)-System in a way that permits the replacement of an arbitrary number of erased sectors within a track.

US patent application 20110075292 by Richard New, et al. (Mar. 31, 2011) describes SMR drives in which band establishes a respective segment in a log-structured file system. Large error correction (ECC) block sizes within each segment (band) are implemented by storing the intermediate ECC parity state after each partial write of an ECC block. In this case, the ECC block size spans multiple physical sectors, and because of the larger ECC block size the error correction code is more efficient and able to correct larger defect errors on the disk. The ECC code may be implemented in a number of different ways which are known to those skilled in the art of designing ECC codes.

U.S. Pat. No. 7,490,212 to Kasiraj, et al. (Feb. 10, 2009) describes ECC for an SMR drive that is useful for recording and playback of video data in transaction data blocks larger than the conventional 512 byte block size but smaller than the band size. Large physical sectors can be used to improve format efficiency, and large ECC codeword sizes (larger than the transaction block size) can be used to improve reliability without imposing a read-modify-write performance on the system. To do this, the disk drive saves the cumulative ECC parity state between successive partial writes of each transaction block so that the parity computed in a first write operation is used to generate the parity for a subsequent write operation. For example, a transaction block size might be one megabyte, and the ECC might span the entire band. Each time a transaction block is written, gradually filling up the band, the cumulative parity state for the ECC is maintained, so that at the end of the last transaction block in that band, the ECC parity can be written out. This provides a very long ECC block size and therefore a very efficient ECC code which is resilient to defects and errors. The ECC code could be very simple, such as a single parity sector computed by XORing all of the data in the physical sectors in the band. This provides protection against a single sector failure within the band. However, using XORing the error correction block is a parity sector that can only correct one data block and is not scalable.

Published patent application 20110096828 (Apr. 28, 2011) by Ying Chen, et al. describes a system with encoding and decoding blocks with multiple independent scalability layers. The FEC is assumed to be applied to a "block" or "fragment" of data at a time, i.e., a "block" is a "source block" for FEC encoding and decoding purposes. A client device can use the segment indexing described herein to help to determine the source block structure of a segment. The FEC codes considered for use with block-request streaming are typically systematic FEC codes, i.e., the source symbols of the source block may be included as part of the encoding of the source block and thus the source symbols are transmitted. A systematic FEC encoder generates, from a source block of source symbols, some number of repair symbols and the combination of at least some of the source and repair symbols are the encoded symbols that are sent over the channel representing the source block. Some FEC codes may be useful for efficiently generating as many repair symbols as needed, such as "information additive codes" or "fountain codes" and examples of these codes include "chain reaction codes" and "multi-stage chain reaction codes". Other FEC codes such as Reed-Solomon codes may practically only generate a limited number of repair symbols for each source block.

SUMMARY OF THE INVENTION

Embodiments of the invention described herein allow the recovery of "squeezed" sectors in set of sequential sectors by use of parity sectors and an erasure decoder that permits the replacement of an arbitrary number of erased sectors within a track without the need of entering Data Recovery Procedures (DRP), thus without additional performance loss. In Shingled Magnetic Recording (SMR) disk drives, sequential data blocks are generally written in sequential tracks in SMR drives, so a repair block that covers multiple sequential data blocks is practical. The problem requires a data integrity feature that permits the confirmation of the integrity of the parity sectors before they are used to replace the erased sector data. Embodiments of the invention use a programmable erased sector recovery scheme, which is a concatenation of a "Cauchy-type" track erasure correction code, together with a media-error correction code that generates N-weighted parity-sectors per track and is capable of replacing up to N-erased sectors per track in any possible combination.

Embodiments of the invention include a track-erasure decoder that utilizes the media-error correction checks to recover the key-ID of the erased sectors to provide a "data-integrity handshake" prior to replacing the erased sectors by requiring that the recovered key-ID matches the old key-ID thus guaranteeing the integrity of the erasure recovery.

Embodiments of the invention include an N-sector track erasure recovery scheme architecture that uses N-programmable multipliers and N-parity sector SRAM-storage that permits on-the-fly hardware erasure decoding and thereby saves the latency required by firmware data recovery processing and is implementable by SRAM-buffers.

Embodiments of the invention include on-the-fly abort recovery which is made feasible due to track-erasure recovery scheme SRAM-buffer architecture that permits purging erased data from the Track-Erasure SRAM during the write operation.

Embodiments of the invention use a combination of sector and multiple sector ECC approaches. The number of sectors covered by the multiple sector ECC can be scaled up to an entire track. The description of embodiments of the invention will generally use "track" to refer to the multiple sector ECC coverage with the understanding that embodiments covering less than a track can also be implemented. The sector metadata-symbol erasure-correction-code will be called "Media Error Detection Code" (MEDC) herein. Each sector of user supplied data is written to the track as an Media-ECC codeword which includes check symbols calculated from the user data. The "Track Erasure Decoder" (TED) uses the user data and check symbols in the Media-ECC codeword to generate a selected number of parity sectors that are written to the track. The "Track Erasure Decoder" (TED) is a Cauchy-type multiple-sector erasure-correction-code. Embodiments of the invention achieve verifiable OTF-Erasure Recovery in SMR-HDD using a concatenation of these two types of codes.

Encoder/syndrome generator components of a TED generate r-parity sectors using r-programmable multipliers according to an embodiment. An SRAM-buffer can be used to store the parity data accumulated over the whole track and has the capability to "purge" on-the-fly (OTF) partial sector data, using the sector data in the DRAM-buffer, once a sector erasure pointer is obtained from the MEDC. The calculation of the parity sectors forces them to be Media-ECC codewords, enabling a data integrity check that includes the recovery of the key-ID/LBA symbols of the erased sectors, prior to using the parity sectors to replace the erased sectors.

DETAILED DESCRIPTION OF THE INVENTION

Figure 1A:
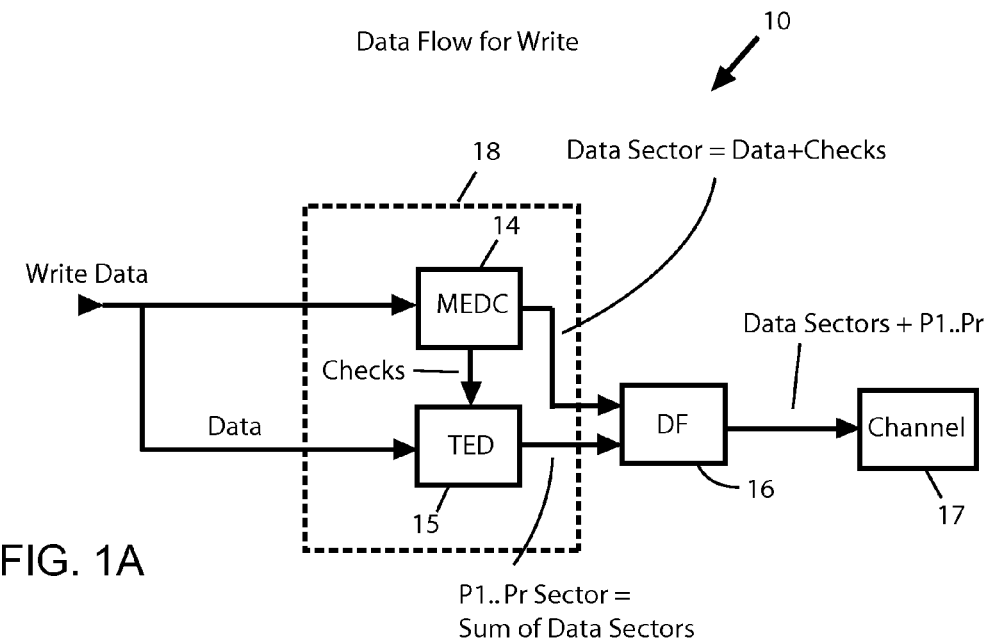
FIG. 1A is a block illustration of the components in the data flow path in a write operation in a disk drive according to an embodiment of the invention.

Embodiments of the invention allow scalable repair block error correction for sequential multiple data blocks in a disk drive. For example, a repair block can be used to store error correction symbols for multiple data blocks. This could be one repair block for one data track, or it could be one repair block for a certain amount of data such as 1 megabyte). The term "scalable" is used herein to mean that each repair block can be designed to correct 2, 3, 4, 5, 6, or more individual data blocks.

In a preferred embodiment Cauchy encoding is used because this mathematical method allows efficient/small amount of dedicated hardware to perform on-the-fly (OTF) calculations). Prior art XOR dedicated hardware only creates a parity block.

The invention can be used advantageously in Shingled Magnetic Recording (SMR) disk drives. Sequential data blocks are generally written in sequential tracks in SMR drives, so one repair block for multiple sequential data blocks is practical. If used in conventional hard drives, the random writes of single LBAs would require reading of the entire track then modification and rewrite of repair block.

Embodiments of the invention achieve verifiable OTF-Erasure Recovery in SMR-HDD using a combination (concatenation) of:

1. sector Metadata-Symbol Erasure-Correction-Code ["Media Error Detection Code" (MEDC)]; and 2. Cauchy-Type Multiple-sector Erasure-Correction-Code ["Track Erasure Decoder" (TED)]

The MEDC can be implemented in various ways known in the art. The TED is preferably designed as a "Cauchy-Type." Both Cauchy-Type ECC, as well as Reed Solomon ECC, are "Maximum Distance Separable" (MDS) codes.

A scalable "Cauchy-Type sector Erasure-Correction Code" is a programmable set of sector-symbol multipliers that iteratively generates a Cauchy Matrix that multiplies the sectors in a track to produce cumulatively weighted parity-sectors, where the number of programmable multipliers equals the number of parity sectors. The unique property of a "Cauchy-Type" matrix guarantees that there is a similar set of programmable multipliers that will recover ANY combination of erased data sectors [and parity sectors], up to the MDS-correction capability, by iteratively generating the appropriate inverse submatrix.

This "Cauchy-Type" property permits OTF-erased sector recovery of a programmable number of erased sectors, using relatively inexpensive encoder/decoder hardware and, most importantly, it permits the storage of parity-sectors in SRAM making this scheme implementable in hard drive controller (HDC) Logic. In contrast shift-register storage of parity sectors would require millions of gates.

The concatenated MEDC provides sector erasure pointers to the TED and also a means to verify its correctness, as the parity-sector calculation automatically satisfies the check equations of the metadata-ECC. This provides a means to verify the integrity of the parity sectors and furthermore the recovery of old key-ID of the erased sectors as a "Data Integrity Handshake". This natural concatenation guarantees a simple implementation of the mandatory verification of the erased-sector recovery, using existing HDC-hardware.

Benefits of the invention include density gains on the order of 3% of hard error rate specification. ECC information occupies ~0.5% at track OD and 1.0% at ID. Complexity increases with increased number of sector correction capability. Sequential operation performance is maintained.

Track-Erasure Encoder/Decoder (TED) Hardware-Architecture

FIG. 1A is a block illustration of selected components in the data flow path 10 in a write operation in a disk drive according to an embodiment of the invention. Unless noted otherwise the components of the drive operate according to the prior art. The write data flows into the ECC module 18 which includes the Track-Erasure Encoder/Decoder (TED) 15 and Media Erasure Detection Encoder/Decoder (MEDC) 14. The MEDC receives the write data (also called user data) and generates the Data Sector which is the data plus the calculated ECC checks for the data. The TED 15 uses the data and the checks generated by the MEDC along with the cumulative sums in its buffer to generate the output of additional parity sectors $P_1 \ldots P_r$ as the sum of weighted data sectors for the track. The Drive Formatter (DF) 16 performs the standard function of formatting the data before it is delivered the channel 17. The DF 16 appends the parity sectors ECC to the MEDC output to supply the channel 17 with the concatenated Sector Data and $P_1 \ldots P_r$ parity sectors to write the track information.

Figure 1B:
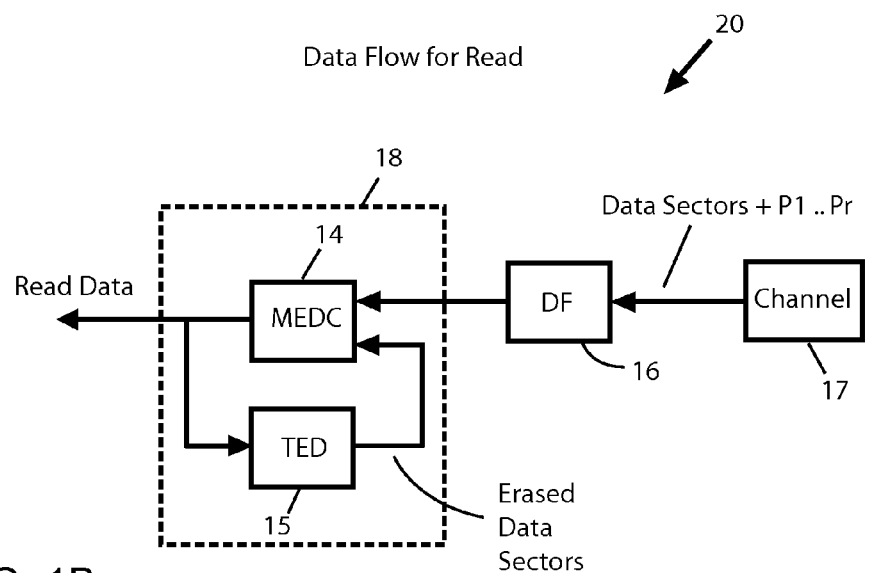
FIG. 1B is a block illustration of the components in the data flow path in a read operation in a disk drive according to an embodiment of the invention.

FIG. 1B is a block illustration of components in the data flow path 10 in a read operation in a disk drive according to an embodiment of the invention. The Data Sector and $P_1 \ldots P_r$ parity sectors information comes back from the channel 17 through the DF 16 and into the MEDC 14. The TED 15 uses the data output from the MEDC and generates the Erased Data Sectors for input back to the MEDC.

Figure 1C:
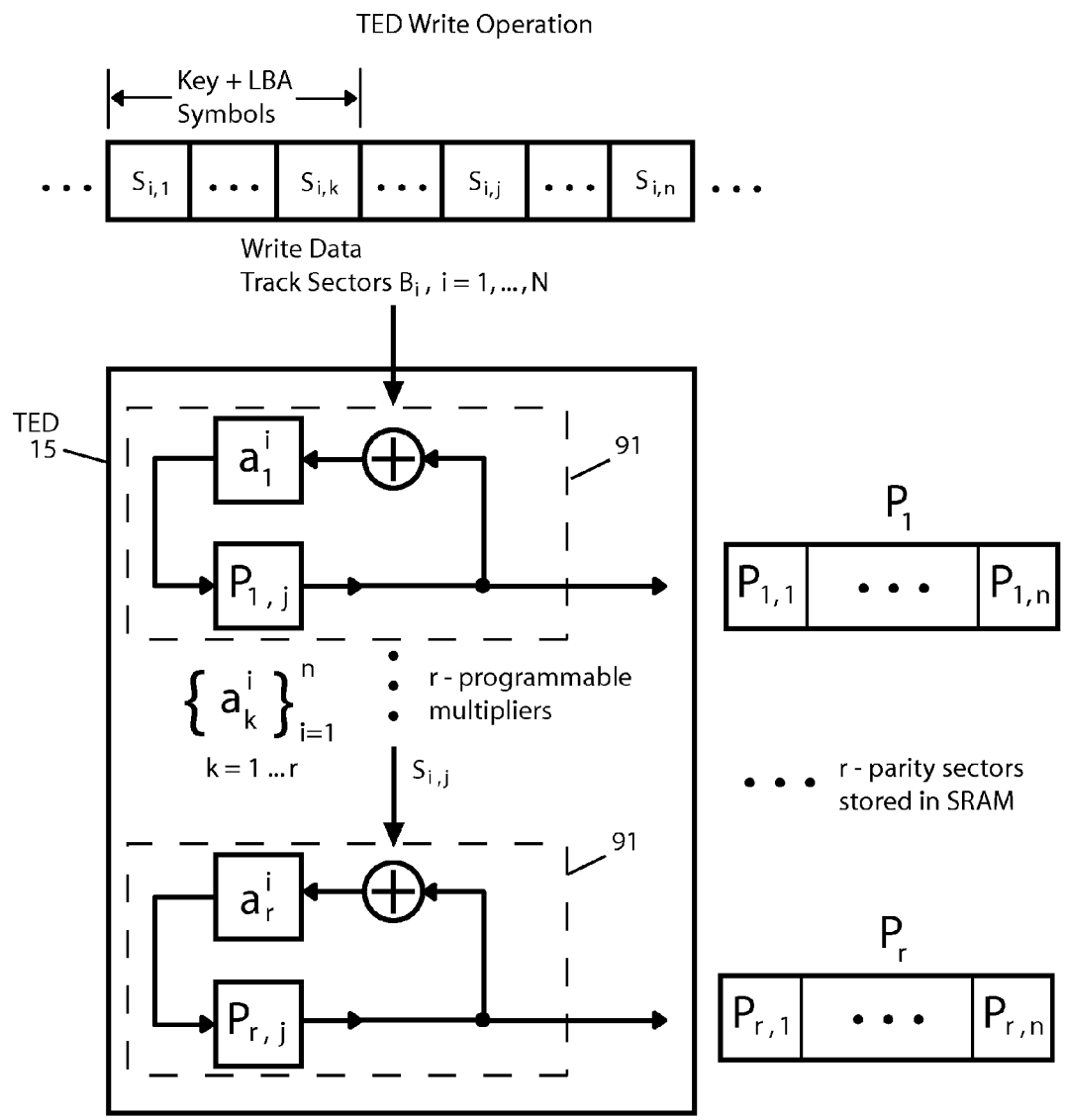
FIG. 1C illustrates the block structure of encoder/syndrome generator components of a TED that generate r-parity sectors according to an embodiment of the invention.

FIG. 1C illustrates the block structure of encoder/syndrome generator components of a TED 15 that generate r-parity sectors according to an embodiment of the invention. The TED 15 includes r-programmable multipliers 91 that each generate a parity sector. The encoder/syndrome generator takes track $T=[B_1, B_2, \ldots B_N]$ composed of N-blocks, $$B_i = [s_{i,j}]_{j=1}^n,$$

over $GF(2^{12})$ is encoded into parity sectors $\{P_j\}_1^r$ by cumulative weighted symbol sums over the Block Index i:

$$P_j = \left[ \sum_{i=1}^N a^i_j s_{i,1}, \sum_{i=1}^N a^i_j s_{i,2}, \ldots, \sum_{i=1}^N a^i_j s_{i,n} \right]$$

The exponent i of the $GF(2^{12})$-multipliers $\{a^i_j\}$, i=1,..., N, is identical to the Block Index i in $B_i$ in the Track T [Multiplier Weights are generated OTF by exponentiation of $a_j$, j=1, ..., r, the number of parity sectors].

After a READ, recalculate Modified Parity Sectors $\hat{P}_j$, the Weighted Block Sum calculation skips over the Erased Blocks $B_{i\ sub(k)}$ indices $i_k$ to produce Syndromes $S_j = P_j \oplus \hat{P}_j$.

Given the Syndrome-Sector $S_j$, j=1, ..., r and the List of Block $B_{i\ sub(k)}$ Erasure Indices $i_k$ we need to calculation the Multiplier Matrix $$M = [a^{i_k}_j], j=1, \ldots, r$$

composed of the Multiplier Columns indexed by Block $B_{i\ sub(k)}$ Erasure Indices $i_k$, the row indices j are those of the Error-Free Parity Sectors. The Syndrome Sectors contain Cumulative $a^{i_k}_j$—Weighted Sums of the Erased Blocks $B_{i\ sub(k)}$.

The Decoder needs to solve the matrix equation $M^{-1}S$, which requires that the Erased Block Multiplier Matrix be invertible.

Track ECC data integrity is address as follows. Parity Sectors are weighted cumulative block sums and satisfy block MEDC check equations. Parity Sector MEDC decidability requires adding cumulative weighted sums of LBA/Key-ID block data, excluding erased blocks. Data integrity verification includes regeneration and "hand-shake" confirmation of old Key-ID.

The Track-Erasure Encoder/Decoder (TED) 15 architecture permits abort-recovery at any block location within a track without the penalty of having to recalculate the parity sectors for the whole track. Block-erasure pointers are used by TED to recover erased blocks to be written in allocated DRAM-buffer space. TED erasure recovery can be done either on-the-fly (OTF) or in data recovery procedures (DRP).

Figure 2:
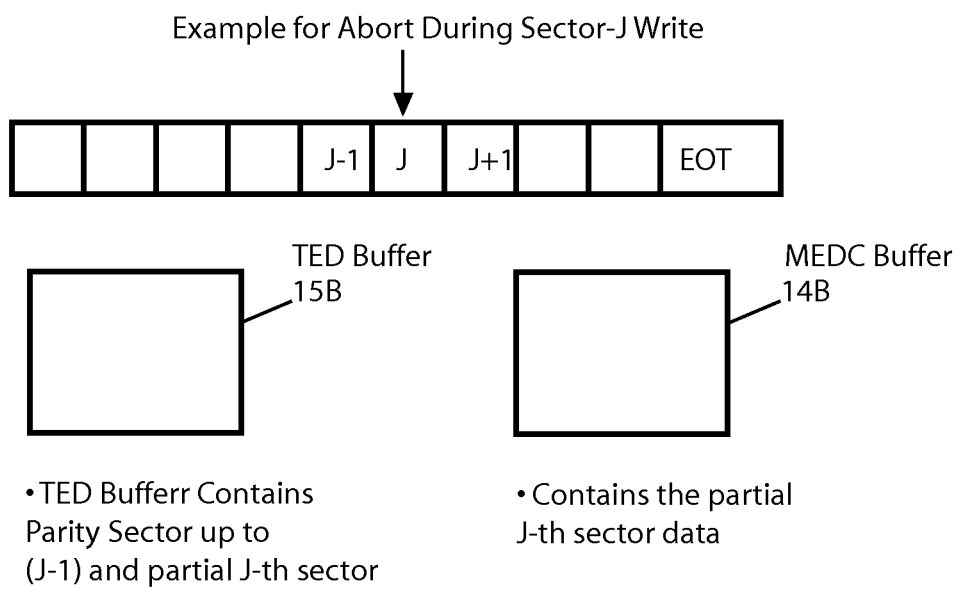
FIG. 2 is an illustration used to describe a process of recovery when an abort occurs during a multi-sector write operation.

The recovery process for the TED buffer 15B in the event of abort during writing multi-sectors of data will be described with reference to FIG. 2. The assumption in this example is that the abort occurs during writing of the Jth sector of at least J+1 sectors. The write command is aborted immediately due to errors. The TED buffer 15B is corrupted by bad data. As shown here, the bad data Jth sector is loaded into TED buffer 15B and MEDC buffer 14B. Correct data for the TED buffer can be recovered without DRP. When Write command is resumed, new data is fed from DRAM. As new data is filled in, TED buffer is recovered at the same time. The recovery method is to read the Jth old sector data in MEDC buffer 14B first as new data Jth sector is written. The TED buffer is then loaded with the content defined as:

{(MEDC) xor (New Data)}$^{J-th}$ xor TED

Track ECC Read Operation

Figure 3:
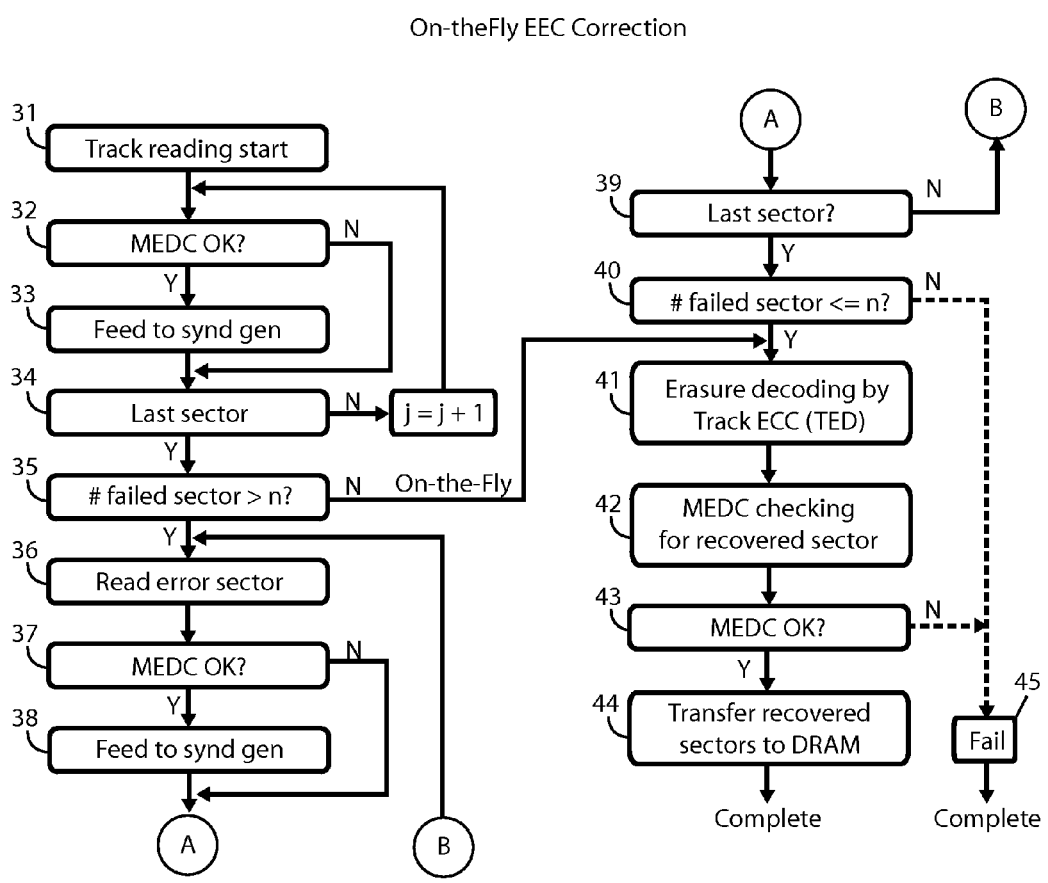
FIG. 3 is a flowchart illustrating a method according to an embodiment of the invention for ECC correction on-the-fly.

FIG. 3 is a flowchart illustrating a method according to an embodiment of the invention for ECC correction on-the-fly. All the sectors on the track are read by the loop 31-34. The MEDC ECC is used to determine the correctness of each sector and count failing ones 32. Correct sector data is fed to the syndrome generator 33.

If the number of failing sectors is more than a predetermined value "n" 35, the method does a re-read or another error recovery to attempt to reduce the number of error sectors down to the correctable number 36-40. The starting sector can be chosen from arbitrary sectors on the track. LBA of failing sectors is available in UNC Error Map.

When the number of error sectors <=n, track erasure decoding according to the invention is available and the method jumps to block 41. Hardware/firmware (HW/FW) sets the erasure pointer from the error sector LBA before starting decoding. HW/FW starts track erasure decoding, then waits for decoding completion. MEDC error checking is performed for recovered sectors after track erasure decoding 42-43. MEDC validates recovered sectors as well as recovers the lost LBA and Key ID and checks recovered data, then waits for checking completion. If MEDC error checking is ok, recovered sector can be transferred from TED SRAM to DRAM 44. If the correction limit is exceeded then failure is reported 45.

Figure 4A:
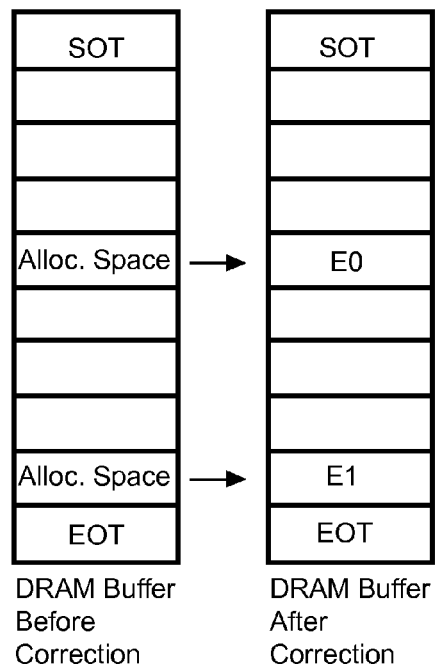
FIGS. 4A and 4B are illustrations used to describe an error correction process according to an embodiment of the invention.
Figure 4B:
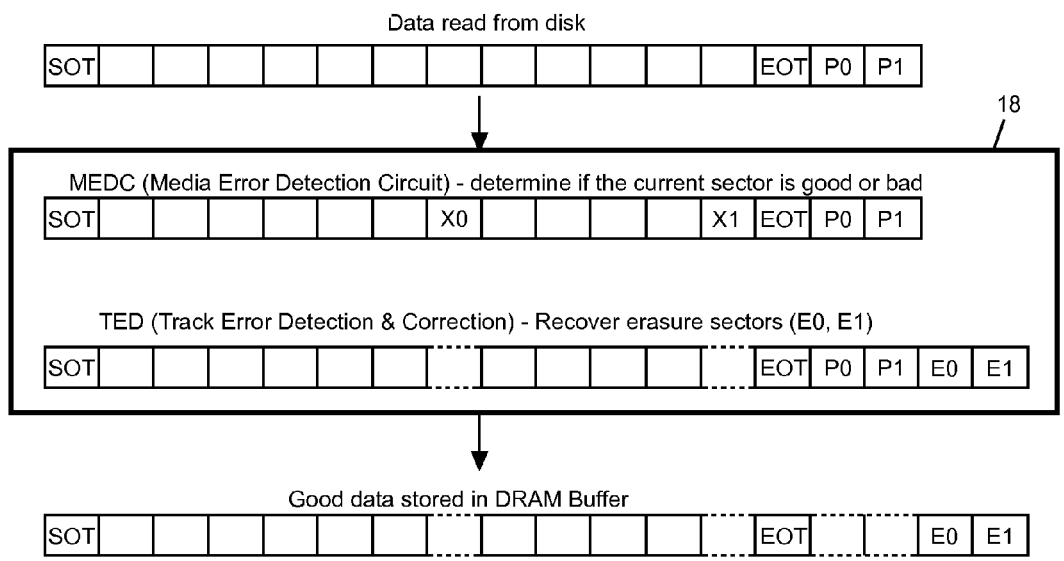

FIGS. 4A and 4B are illustrations of data that will be used to describe an error correction process according to an embodiment of the invention. In this example sector data is coming in from channel as in FIG. 1B. SOT is start of track and EOT is end of track. MEDC validates data sectors and non-adjacent sectors x0 and x1 are determined to be bad as shown in FIG. 4B. Good sector data are uploaded into DRAM buffer and accumulated in TED buffer at the same time. Should bad sector data be detected, the method discards bad sector data but allocates space in DRAM buffer for erasure sectors E0, E1 as shown in FIG. 4A. In FIGS. 3. and 4B, erasure sectors E0, E1 are recovered and uploaded to DRAM following the last sector data.

Cauchy-Matrix Track ECC Computations

A Cauchy-Matrix track ECC for an embodiment of the invention can be found as described in this section. Choose two elements $\{a, b\} \in GF(2^{12})$ and define an r×N matrix whose rows are indexed by i and whose columns are indexed by j. For example, a is $GF(2^{12})$-Generator and $b=a^{499}$. Thus, $$C = \left[ \frac{1}{a_i + b^j} \right],$$

$i=1, \ldots, r, j=1, \ldots, N, a_i = a^i$,
such that $a_i \neq b^j$

Any submatrix of C up to r×r-size is guaranteed to have non-zero determinant. Therefore, we can decode up to r erasures using up to r error free parity sectors in any order.

Cauchy-Matrix inversion constants can be precalculated as follows:

Precalculate $\{A_m\}_{m=1}^{r}$—List $$A_m = \prod_{k=1}^{m-1}(a_k + a_m)\prod_{k=m+1}^{r}(a_k + a_m), m < r$$

$$A(r) = \prod_{k=1}^{r-1}(a_k + a_r)$$

Precalculate $\{B_m\}_{m=1}^{r}$—List $$B_m = \prod_{k=1}^{m-1}(b^k + b^m)\prod_{k=m+1}^{r}(b^k + b^m), m < r$$

-continued $$B(r) = \prod_{k=1}^{r-1}(b^k + b^r)$$

Precalculate $\{E_m\}_{m=1}^{r}$—List $$E_m = \prod_{k=1}^{r}(a_m + b^k), m = 1, \ldots, r$$

Precalculate $\{F_m\}_{m=1}^{r}$—List $$F_m = \prod_{k=1}^{r}(a_k + b^m), m = 1, \ldots, r$$

The r-parity sector Track-ECC Decoder inverts the Block-Erasure Cauchy-Submatrix M by using the 4r precalculated constant lists {A,B,E,F}:

$$-M^{-1} = [d_{i,j}], i, j = 1, \ldots, r$$

$$d_{i,j} = \frac{E_i F_j}{A_i B_j (a_i + b^j)}$$

requires: $1A + 3M + 1D$ where i=parity sector Index, j=Erased Block Index

The invention claimed is:

1. A data storage device that stores data in tracks that include a plurality of sectors of data, the data storage device comprising:
   a media erasure detection encoder/decoder (MEDC) that receives data comprising a set of sectors to be written sequentially on a selected track and generates error correction code (ECC) check symbols for each sector of the data; and
   a track-erasure encoder/decoder (TED) that receives the data and the ECC check symbols for each sector of the data generated by the MEDC and generates one or more cumulatively weighted parity-sectors per track to be recorded on the selected track, the cumulatively weighted parity-sectors being generated sequentially from the data and ECC check symbols for each sector for the selected track.

2. The data storage device of claim 1 wherein the TED uses a Cauchy-type track erasure correction code and is capable of replacing up to N erased sectors per track in any possible combination, where N is the number of cumulatively weighted parity-sectors per track and N is equal to or greater than one.

3. The data storage device of claim 1 wherein the TED further comprises a programmable set of sector-symbol multipliers that iteratively generates a Cauchy Matrix that multiplies the data in the sectors in the selected track to produce the cumulatively weighted parity-sectors, and wherein the number of multipliers equals the number of parity sectors.

4. The data storage device of claim 3 wherein erasure decoding is performed on-the-fly using memory buffers.

5. The data storage device of claim 1 wherein on-the-fly write abort recovery includes purging erased data from a track-erasure memory buffer in the TED.

6. The data storage device of claim 1 wherein the parity sectors are written as error correction code codewords.

7. The data storage device of claim 6 wherein an identifier symbol of an erased sector is recovered as a data integrity check.

8. The data storage device of claim 6 wherein the identifier symbol of an erased sector is recovered as a data integrity check prior to using the parity sectors to replace erased sectors.

9. A method of operating a data storage device that stores data in tracks on a disk that include a plurality of sectors of data, comprising:

for each sector of user data in a set of sectors of user data written sequentially on a selected track on the disk, writing media erasure detection check symbols along with each sector of the data on the selected track; and generating a set of one or more cumulatively weighted parity-sectors using the set of sectors of user data and media erasure detection check symbols for each sector, the set of cumulatively weighted parity-sectors providing redundant information that allows recovery of at least one erased sector of user data when the selected track is read; and writing the set of cumulatively weighted parity-sectors on the selected track along with the set of sectors of user data and media erasure detection check symbols for each sector.

10. The method of claim 9 wherein generating the set of one or more cumulatively weighted parity-sectors further comprises using a Cauchy-type track erasure correction code.

11. The method of claim 9 wherein generating the set of one or more cumulatively weighted parity-sectors further comprises forming a Cauchy Matrix that multiplies the set of sectors of user data and media erasure detection check symbols for each sector to produce the set of cumulatively weighted parity-sectors.

12. The method of claim 9 wherein each of the parity-sectors are written on the track as error correction code codewords with media erasure detection check symbols.

13. The method of claim 12 further comprising reading the set of parity-sectors from the selected track along with the set of sectors of user data and media erasure detection check symbols for each sector and recovering an identifier symbol of an erased sector as a data integrity check for each parity-sector.

14. The method of claim 9 further comprising reading the set of cumulatively weighted parity-sectors from the selected track along with the set of sectors of user data and media erasure detection check symbols for each sector and using the set of parity-sectors to recover at least one erased sector of user data.

15. The method of claim 9 further comprising reading the set of cumulatively weighted parity-sectors from the selected track along with the set of sectors of user data and media erasure detection check symbols for each sector and performing on-the-fly erasure recovery of at least one sector of user data using the media erasure detection check symbols and the set of cumulatively weighted parity-sectors in combination.

* * * * *

UNITED STATES PATENT AND TRADEMARK OFFICE
CERTIFICATE OF CORRECTION

PATENT NO. : 8,856,618 B2  
APPLICATION NO. : 13/645309  
DATED : October 7, 2014  
INVENTOR(S) : Kei Akiyama et al.

It is certified that error appears in the above-identified patent and that said Letters Patent is hereby corrected as shown below:

In the Specification 1. col. 5, line 67 the mathematical formula should be:

$$B_l = [s_{l,j}]_{j=1}^r$$

2. col. 6, line 1 the mathematical expression should be:

$$\{P_j\}_1^r$$

3. col. 6, line 20 the mathematical formula should be:

$$M = [a_j^{i_k}], j = 1, \ldots, r$$

4. col. 7, line 50 the mathematical expression should be:

$$\{A_m\}_{m=1}^r$$

5. col. 7, line 61 the mathematical expression should be:

$$\{B_m\}_{m=1}^r$$

6. col. 8, line 6 the mathematical expression should be:

$$\{E_m\}_{m=1}^r$$

7. col. 8, line 13 the mathematical expression should be:

$$\{F_m\}_{m=1}^r$$

8. col. 8, line 25 the mathematical formula should be:

$$M^{-1} = [d_{i,j}] i, j = 1, \ldots, r$$

Signed and Sealed this  
Second Day of June, 2015

Michelle K. Lee  
*Director of the United States Patent and Trademark Office*